(12) United States Patent
Engholm et al.

(10) Patent No.: US 6,642,936 B1
(45) Date of Patent: Nov. 4, 2003

(54) TOUCH ZOOM IN/OUT FOR A GRAPHICS DISPLAY

(75) Inventors: Kathryn A. Engholm, Beaverton, OR (US); Mark D. Demory, Milton-Freewater, OR (US)

(73) Assignee: Tektronix, Inc., Beaverton, OR (US)

( * ) Notice: Subject to any disclaimer, the term of this patent is extended or adjusted under 35 U.S.C. 154(b) by 450 days.

(21) Appl. No.: 09/634,697

(22) Filed: Aug. 8, 2000

(51) Int. Cl.[7] .................................................. G09G 5/00
(52) U.S. Cl. ....................................... 345/661; 345/764
(58) Field of Search .......................... 345/173, 660–671, 345/781, 788, 801

(56) References Cited

U.S. PATENT DOCUMENTS

| | | |
|---|---|---|
| 4,755,811 A | 7/1988 | Slavin et al. |
| 5,039,937 A | 8/1991 | Mandt et al. |
| 5,119,079 A | 6/1992 | Hube et al. |
| 5,553,225 A | 9/1996 | Perry |
| 5,666,498 A | 9/1997 | Amro |
| 5,699,535 A | 12/1997 | Amro |
| 5,732,230 A * | 3/1998 | Cullen et al. ................ 345/764 |
| 5,764,818 A * | 6/1998 | Capps et al. ................ 382/317 |
| 5,790,819 A | 8/1998 | Rosenburg et al. |
| 5,877,621 A | 3/1999 | Beyers et al. |
| 5,939,877 A | 8/1999 | Alexander |
| 6,052,110 A * | 4/2000 | Sciammarella et al. ..... 345/661 |
| 6,421,063 B1 * | 7/2002 | Morrison .................... 345/660 |
| 6,424,355 B2 * | 7/2002 | Watanabe et al. ........... 345/668 |

* cited by examiner

Primary Examiner—John Cabeca
Assistant Examiner—Brian Detwiler
(74) Attorney, Agent, or Firm—Francis I. Gray

(57) ABSTRACT

A method of zooming in/out for a graphics image on a display screen encompasses drawing a rectangle on the display screen, either entirely within a display area of the display screen for two-dimensional zoom in/out or along one axis within a peripheral area of the display screen for one-dimensional zoom in/out. Once the rectangle is drawn by dragging from one corner to an opposite corner, tapping or clicking within the rectangle causes a zoom in action and tapping or clicking outside the rectangle causes a zoom out action.

3 Claims, 3 Drawing Sheets

TOUCH ZOOM IN/OUT FOR A GRAPHICS DISPLAY

BACKGROUND OF THE INVENTION

The present invention relates to touch screen interfaces, and more particularly to a method of zooming in/out for a graphics display.

A quick and intuitive method for zooming in on a user-defined section of a graphics display is to simply indicate a rectangle with a mouse or touch on a graphics display screen by dragging one corner to an opposite corner. The area within the rectangle is then expanded in two dimensions to fill the entire display upon a user action, such as lifting the mouse cursor or touch, clicking a zoom button or clicking within the rectangle. The issue of how to perform the opposite action—zooming out—has not been well addressed to date. Another weakness of the present method is that a one-dimension-only zoom is somewhat awkward in that the operator has to think carefully about the problem, then draw the rectangle to completely span the axis that he doesn't want to affect.

What is desired is a quick and intuitive method for zooming out as well as zooming in including an easy way for performing one-dimension-only zooming.

BRIEF SUMMARY OF THE INVENTION

Accordingly the present invention provides a method of zooming either in or out by drawing a rectangle on a graphics display, using either touch or a mouse. A pair of icons are presented, one within the rectangle and the other outside the rectangle. Clicking or touching within the rectangle results in zooming in so that what is inside the rectangle fills the entire display, and clicking or touching outside the rectangle results in zooming out so that the entire display is compressed to within the rectangle with additional previously unseen portions of the image fill the remainder of the screen. For one-dimensional-only zooming the rectangle is drawn along an axis in a peripheral area of the display, and the rectangle completely encompasses the other axis.

The objects, advantages and other novel features of the present invention are apparent from the following detailed description when read in conjunction with the appended claims and attached drawing.

DETAILED DESCRIPTION OF THE INVENTION

Figure 1:
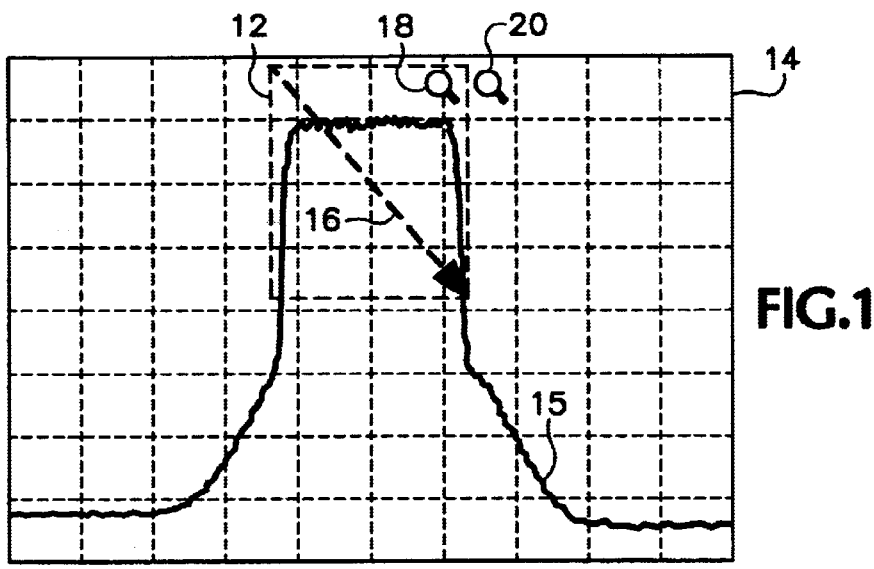
FIG. 1 is a plan view of a graphic screen display for drawing a rectangle according to the present invention.
Figure 2:
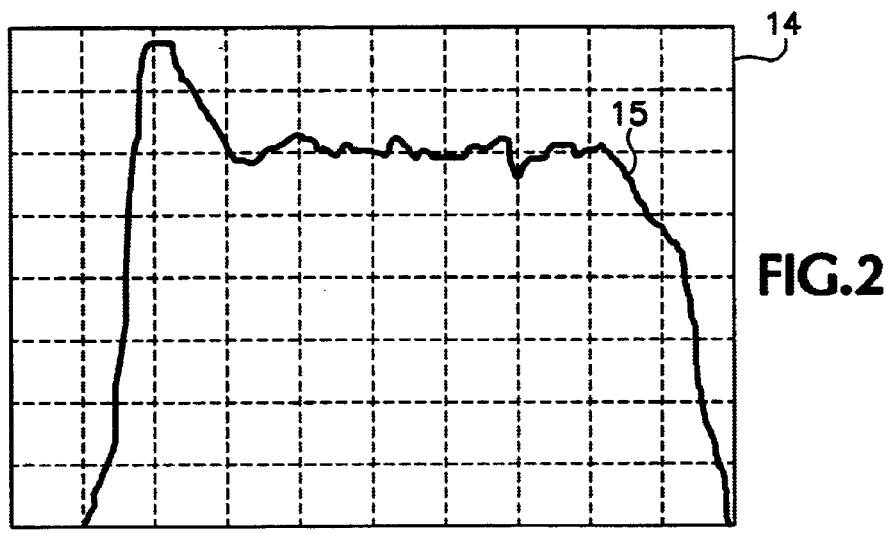
FIG. 2 is a plan view of a graphic screen display showing zoom in for the rectangle of FIG. 1.
Figure 6:
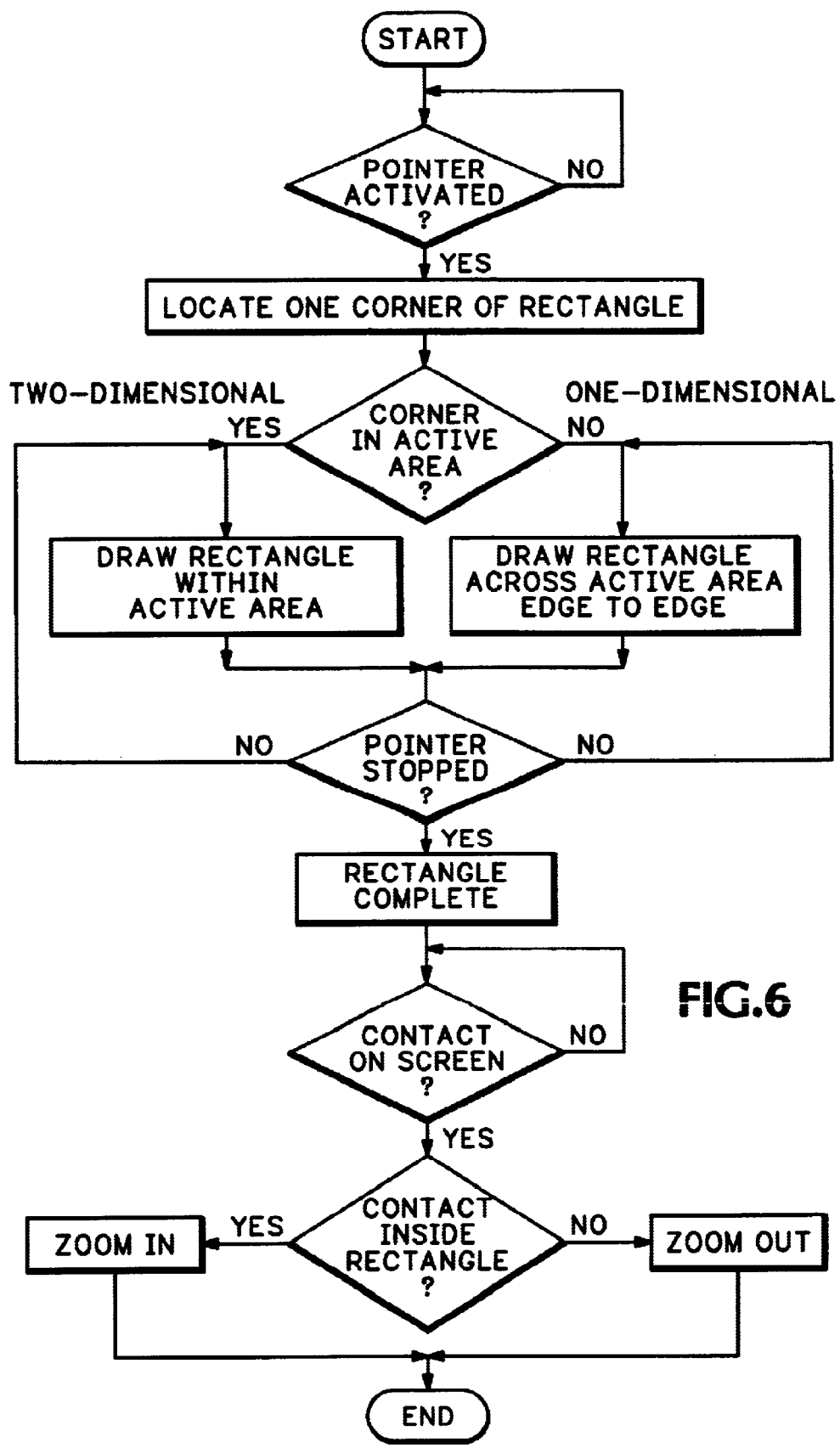
FIG. 6 is a flow chart view of the zoom in/out method according to the present invention.

Referring now to FIGS. 1 and 6 for a two-dimensional zoom in/out a user describes a rectangle 12 on a graphics display screen 14 having an image 15 by dragging a mouse cursor or touch pointer from one corner to an opposite corner of a portion of the display as illustrated by an arrow 16. As is well known, the arrow 16 does not have to actually be displayed on the screen 14, and generally isn't, but is shown here to illustrate the path of the pointer. The user touches the screen 14 at the upper left end of the arrow 16 and drags to the lower right tip of the arrow, then lifts the touch pointer or mouse button. As the user drags along the screen 14, the zoom rectangle 12, shown with dashed lines, grows to follow the progress of the pointer/cursor. Upon completion of the drag operation two symbols 18, 20 appear superimposed on the graphics display screen 14 to provide a hint about what to do next. One symbol 18 is inside the rectangle 12 and the other 20 is outside. The inside symbol 18 indicates Zoom In and the outside symbol 20 indicates Zoom Out. Clicking or touching anywhere within the rectangle 12 causes the Zoom In action to expand the rectangle's contents to fill the graphics display screen 14, as shown in FIG. 2. The new display is scaled to shown the contents of the zoom rectangle 12 increased in size both horizontally and vertically to fill the original display area.

Figure 3:
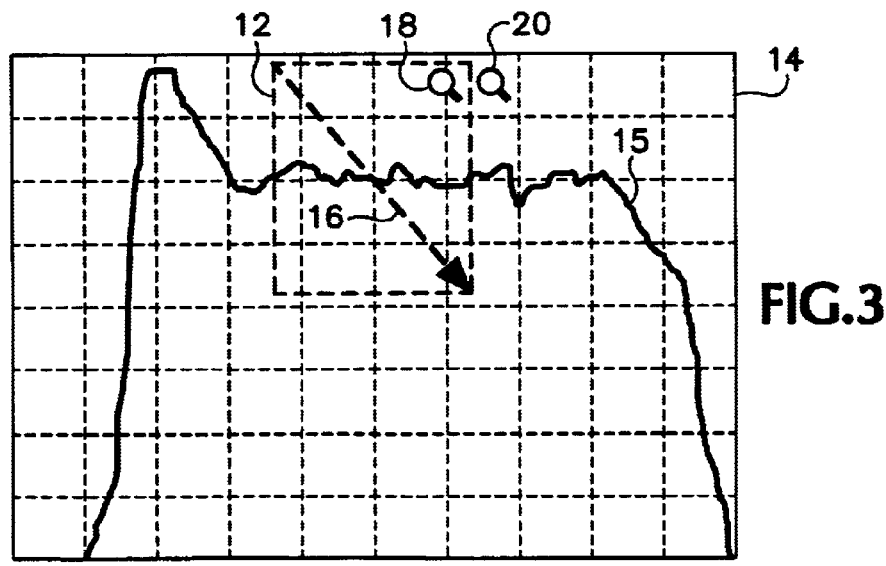
FIG. 3 is a plan view of a graphic screen display for drawing a rectangle on the display of FIG. 2.
Figure 4:
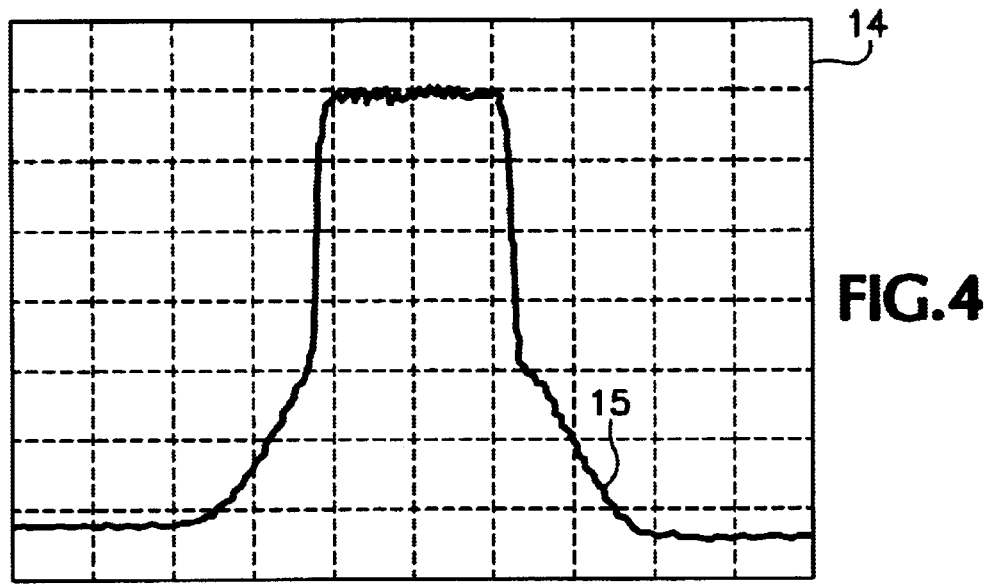
FIG. 4 is a plan view of a graphic screen display showing zoom out for the rectangle of FIG. 3.

Clicking outside the zoom rectangle 12 causes the Zoom Out action to shrink the graphics image 15 such that the graphics image that previously covered the entire area now is scaled to fit within the rectangle, as shown in FIG. 4 with respect to FIG. 3. The area outside the rectangle 12 now contains the portion of the graphics image 15 that was previously outside the graphics viewing area.

Figure 5:
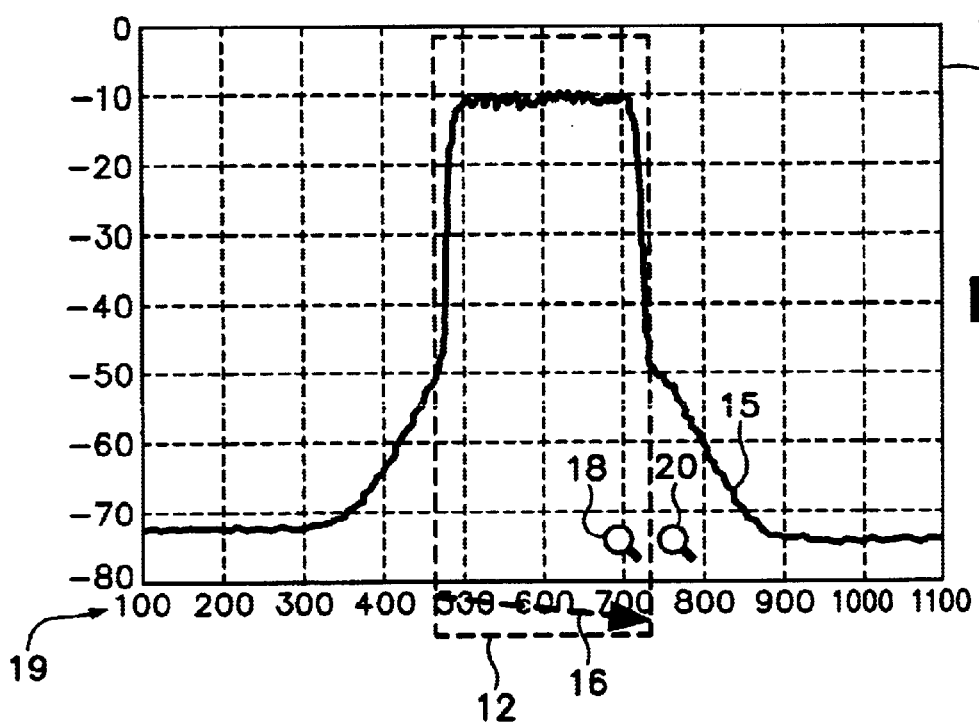
FIG. 5 is a plan view of a graphic screen display for drawing a rectangle for one-dimension-only zoom in/out according to the present invention.

One-dimensional zoom in/out is accomplished by dragging the rectangle 12 in an axis area 19 adjacent the graphics image 15, as shown in FIGS. 5 and 6. For example, dragging across a portion of the horizontal axis 19 creates the rectangle 12 that spans the entire vertical range of the graphic image 15, but only the portion of the horizontal range which the user wishes to target for zoom in/out. Likewise dragging across a portion of the vertical axis 19 creates a zoom rectangle 12 that spans the entire horizontal range, but only the portion of the vertical range which the user wishes to target for zoom in/out. Upon touching within the zoom rectangle 12 the image 15 is expanded in one direction only to either fill the entire display area (Zoom In) or to compress the current image to be within the zoom rectangle (Zoom Out) displaying portions of the image that previously were outside the display area.

Additionally an Undo button may be displayed, either within the display area or adjacent to it. When the user presses the Undo button, the last display scaling action, such as those described above, is reversed, returning the display to the state it was in before the scaling action was initiated. The Undo button then changes into a Redo button. Pressing the Redo button repeats the scaling action that was undone by the Undo button, and the Redo button becomes the Undo button again. By pressing this button multiple times, the user may switch back and forth between two displays of different scale factors, either horizontal, vertical or both.

Thus the present invention provides a method of zooming in/out using a rectangle drawn on a graphics display screen, providing indicators of Zoom In and Zoom Out inside and outside the rectangle respectively, and performing the scaling function indicated by where the user taps or clicks—inside or outside the rectangle.

What is claimed is:

1. A method of performing a one-dimensional zoom in/out function for a graphics image on a display screen, the display screen having a display area and having a peripheral area along an axis of the display screen, comprising the steps of:

drawing a rectangle to encompass a portion of the graphics image within the display area by defining a length along the peripheral area; and contacting the display screen at a point either inside or outside the rectangle, the point determining either a zoom-in or zoom-out action for the one-dimensional zoom in/out function, the zoom-in action expanding the graphics image along the axis so that the portion of the graphics image fills the display area and the zoom-out action compressing the graphics image along the axis so that the graphics image fits within the rectangle with portions of the graphics image formerly outside the display area now being within the display area.

2. The method as recited in claim 1 further comprising the steps of:

providing a redo/undo button on the display screen; and contacting the redo/undo button to reverse the zoom-in/zoom-out action, the function of the redo/undo button changing between redo and undo for every contact.

3. The method as recited in claim 1 wherein the contacting step comprises the steps of:

contacting the display screen at the point within the rectangle to indicate the zoom-in function; and contacting the display screen at the point outside the rectangle to indicate the zoom-out function.

* * * * *